United States Patent
Bloom

[11] 3,766,720
[45] Oct. 23, 1973

[54] CENTRIFUGAL SEPARATOR

[75] Inventor: Carl Bloom, Springfield, Mass.

[73] Assignee: Worthington Compressor and Engine International Division of Worthington Corporation, Holyoke, Mass.

[22] Filed: Nov. 1, 1971

[21] Appl. No.: 194,756

Related U.S. Application Data

[62] Division of Ser. No. 14,306, Feb. 26, 1970, Pat. No. 3,654,748.

[52] U.S. Cl. .................................................. 55/461
[51] Int. Cl. ............................................. B01d 45/12
[58] Field of Search ........................ 55/318–319, 55/399, 447, 461, 456–457; 210/304

[56] References Cited
UNITED STATES PATENTS
869,680 10/1907 Aitken et al. ........................ 55/461
1,362,251 12/1920 Keylogg ........................... 55/461 X
2,191,190 2/1940 DeGuire ............................. 55/461
2,274,050 2/1942 Etwanik ............................. 55/319

FOREIGN PATENTS OR APPLICATIONS
27,838 3/1907 Austria ............................... 55/461

Primary Examiner—Frank W. Lutter
Assistant Examiner—Vincent Gifford
Attorney—David S. Fishman et al.

[57] ABSTRACT

A centrifugal separator for gases having suspended liquid particles including a cylindrical body with a spiral baffle disposed therein. The contiguous convolutions of the baffle define alternate venturi and diffusing portions in the direction of gas flow.

1 Claim, 3 Drawing Figures

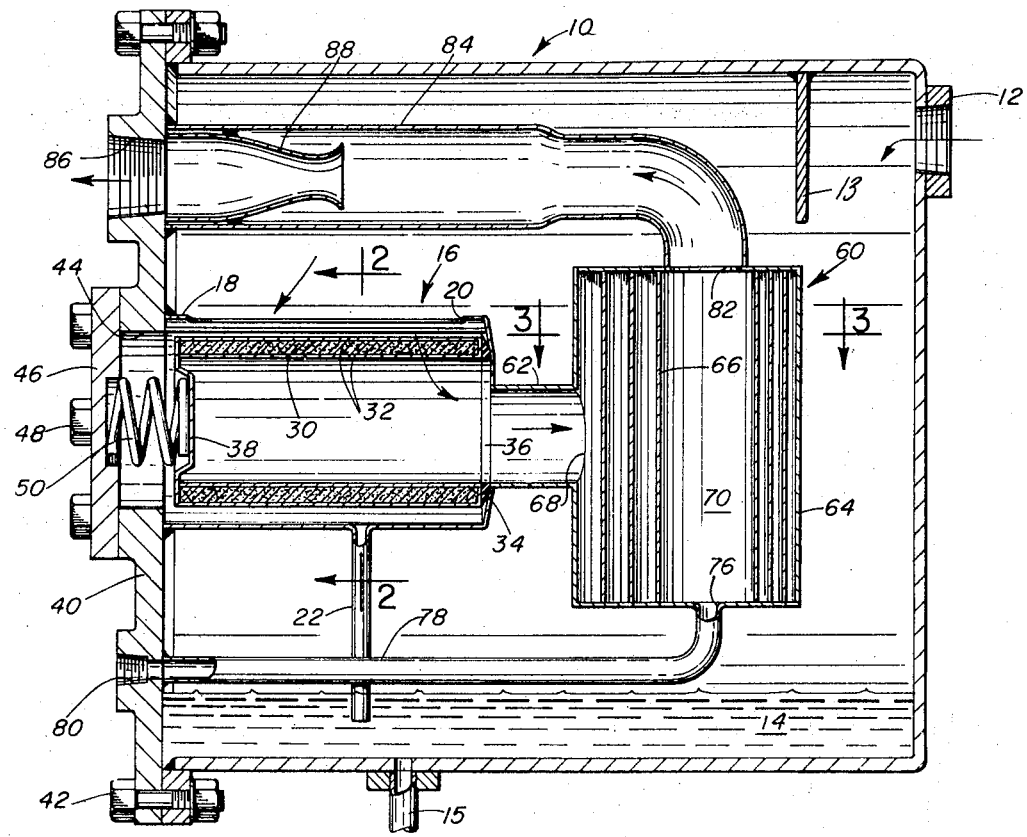
Fig. 1
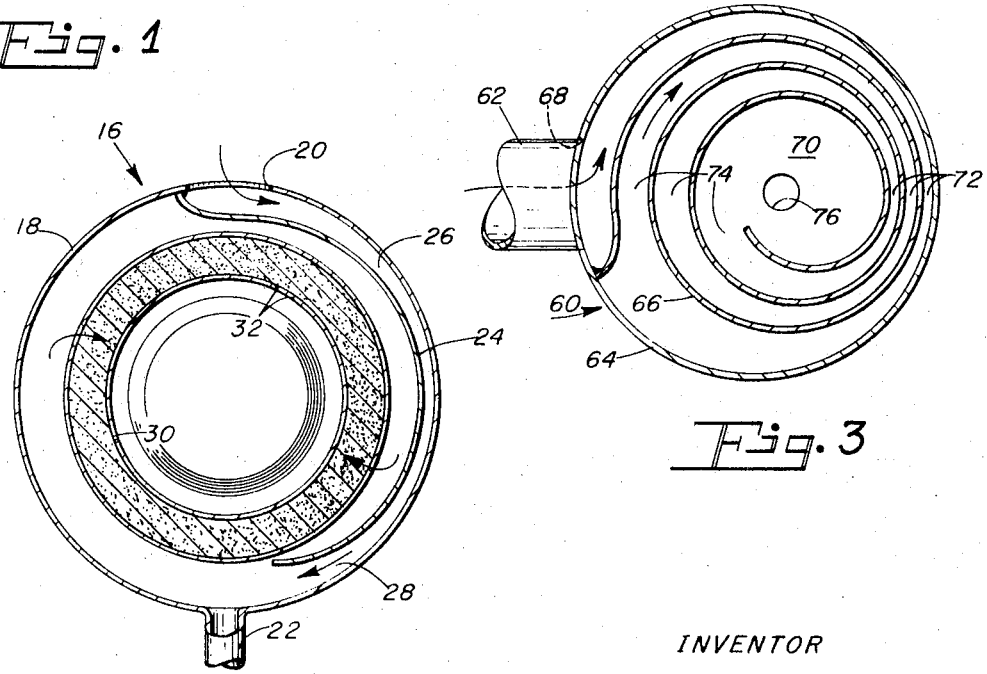
Fig. 2
Fig. 3
INVENTOR
CARL BLOOM
BY Fishman & Van Kirk
Attorneys

CENTRIFUGAL SEPARATOR

CROSS-REFERENCE TO RELATED APPLICATION.

This application is a division of U.S. application Ser. No. 14,306 filed Feb. 26, 1970, now U.S. Pat. No. 3,654,748 issued Apr. 11, 1972.

BACKGROUND OF THE INVENTION:

1. Field of the Invention

The invention relates to the field of liquid and gas separators which employ both agglomerating and centrifugal separating stages through which the liquid and gas mixture passes serially during the separating process.

2. Description of the Prior Art

Liquid and gas separators which employ a plurality of stages for filtering or separating the liquid and gas mixture are well known in the art. Such devices have a multitude of applications wherever either a purified gas mixture, or a purified liquid or both purified liquid and gas are desired. An example of the latter situation is commonly found in rotary vane or screw-type gas compressors where lubricating oil is injected into the compressor to cool and lubricate the compressor as it is operating. The high pressure air leaving the compressor is laden with a great deal of the lubricating oil. It is desirable to have the air purified for use with various pneumatic devices, such as air hammers, and to have the oil returned to a reservoir for recirculation through the lubricating system of the compressor.

Liquid and gas separators which are particularly adapted to air and oil mixtures often employ an agglomerator cartridge through which the oil laden air is passed. The cartridge causes the finely divided, atomized particles of oil to agglomerate in large droplets. The heavier droplets react more significantly to inertial forces than the atomized particles and consequently large quantities of oil can be more easily removed from an air flow by centrifugal separators. If the air stream has a fairly high velocity, the stream may recapture atomized particles from the previously agglomerated oil. For these reasons, efficient centrifugal separators used in series with the agglomerator cartridges are desirable.

SUMMARY OF THE INVENTION

The present invention relates to an improved centrifugal separator which is particularly well suited for use in a multistage liquid and gas separator system. The multistage system employs an agglomerator cartridge and the centrifugal separator operates on the gas and liquid mixture expelled from the cartridge.

The agglomerator cartridge which forms a principal portion of the initial or primary separating stage is mounted in a tank that receives the liquid and gas mixture. The cartridge and its casing are mounted to one wall of the tank and if desired a removable cover plate may be added to the external side of the wall to allow access to the agglomerator cartridge for inspection or replacement.

The centrifugal separator of this invention is the final or secondary separating stage and receives the liquid and gas mixture after it has passed through the agglomerator cartridge. The separator is basically a cylindrical chamber positioned vertically within the tank and includes a spiral baffle plate which leads from an inlet aperture in the cylindrical wall of the chamber to the central core of the chamber. The mixture entering the chamber is forced into the spiral channel formed by the baffle. The heavier liquid pariticles agglomerated in a first stage of the separator are caused to impinge on the walls of the chamber and the baffle as the gas continues to the central core. A gas exit aperture formed in the central portion of the chamber ceiling removes the liquid-free gas from the core and a liquid scavenging drain in a central portion of the chamber floor removes the centrifuged liquid.

The convolutions formed by the spiral baffle plate are closely spaced along one radial of the cylindrical chamber and conversely are more widely spaced along the opposite radial. The spacing forms venturi and diffuser sections which will alternately accelerate and decelerate the mixture flowing through the spiral channel to supplement the centrifuging process.

The initial and final separating stages are preferably both supported by the same wall of the tank. Such construction permits easy access to both the separators and the connections to the tank.

BRIEF DESCRIPTION OF THE DRAWINGS:

FIG. 1 is a sectional view of a tank including a primary separating stage with an agglomerating cartridge and the secondary centrifugal separating stage which ingests the mixture from the agglomerating cartridge.

FIG. 2 is a sectional view of the primary separating stage along the line 2—2 of FIG. 1.

FIG. 3 is a sectional view of the secondary centrifugal separating stage along the line 3—3 of FIG. 1.

DESCRIPTION OF THE PREFERRED EMBODIMENTS

Reference to FIG. 1 shows my improved liquid and gas separator in a sectional view.

As indicated by the arrows the liquid and gas mixture enters the tank 10 through a fitting 12 connected to one end wall of the tank and is deflected downwardly by baffle 13. The fitting 12 may be connected to the discharge manifold of a rotary vane compressor in which event the tank would be more commonly known as a demister tank for separating an air and oil mixture. Heavy particles of liquid entrained in the gas stream entering fitting 12 may immediately fall to the pool 14 of liquid in the bottom of the tank as the deflected gas stream decelerates. If desired, the pool 14 may be drained through a convenient outlet 15 or simply stored in the tank 10 for removal at periodic intervals.

Once in the tank, the liquid and gas mixture drifts toward the primary separator generally designated by numeral 16. This separator has a cylindrical outer casing 18 including a longitudinal inlet slot 20 at its top side and a liquid drain line 22 at the bottom side. As seen more clearly in FIG. 2, the mixture entering the casing 18 is forced to follow the inner surface of the casing 18 by a baffle 24 which runs circumferentially from the inlet 20 along one side of the casing 18. The baffle 24 is specially shaped to form a venturi section 26 and a diffuser section 28. The venturi section 26 causes the inflowing mixture to be accelerated to a higher speed as it follows the cylindrical inner wall of casing 18. Some liquid particles entrained in the mixture are centrifuged against the inner surface of casing 18 and eventually flow by gravity to the drain line 22. The diffuser section 28 decelerates the mixture and therefore prevents the centrifuged liquid from being recaptured or aspirated in a high velocity gas stream. The mixture will continue to circulate around the inner surface of casing 18 and baffle 24 and thusly will continue the centrifuging process. Eventually, the mixture passes through an agglomerator cartridge 30 centrally positioned within the casing 18. The cartridge 30 consists of sheets of porous, filter material made from natural, plastic, glass or other fibers and causes the finely divided particles to coalesce in droplets. The cartridge may be held in its cylindrical shape by means of a perforated cage structure 32. At one end of the cartridge in FIG. 1 a seal 34 prevents the mixture from bypassing the cartridge and flowing directly to the centrally located outlet 36 in an end wall of casing 18. At the opposite end of the cartridge a closed cap 38 forming a part of the cage 32 seals the internal side of the cartridge from the external side.

The casing 18 is mounted to the end wall 40 of the tank 10 by welds or any other convenient attachment. The end wall 40 may be a removable end wall secured to the remainder of the tank 10 by clamping bolts 42. Alternately, the wall 40 may be welded directly to the remainder of the tank to provide a less expensive construction. An access hole 44 and a cover plate 46 held by a plurality bolts 48 to the wall 40 are coaxially aligned with the cylindrical casing 18. A cartridge spring 50 is sandwiched between the cover plate 46 and the cap 38 and urges the cartridge 30 with seals 34 into contact with the wall of casing 18 surrounding the outlet 36. The removable cover plate 46 permits the cartridge 30 to be removed for inspection or replacement.

It will be understood that the centrifuging action of the baffle 24 removes a portion of the liquid entrained in the mixture ingested by the primary separator 16. The centrifuged liquid flows by gravity to drain line 22. Drain line 22 extends from the separator 16 to below the surface of pool 14 since the slightly higher pressure outside of the casing 18 would inhibit the draining of centrifuged liquid through a drain hole in the bottom of casing 18. A short column of liquid above the pool surface in the line 22 maintains the lower pressure at the junction of the casing 18 and the line 22 while the separator 16 is in operation.

Another portion of the liquid ingested by the separator 16 is agglomerated in the cartridge 30 and may form droplets large enough to be pulled by gravity from the cartridge through the drain line 22. The remaining liquid agglomerated on cartridge 30 is recaptured in droplets by the gas flow as part of the first stage separating process. The recaptured portion of the liquid continues with the gas through the outlet 36. For this reason my invention includes an improved secondary separator forming the discharge mechanism from the primary separator 16.

The secondary separator, generally designated by numeral 60, receives the mixture with the agglomerated droplets through an interconnecting duct 62. The secondary separator 60 is a closed vertical, cylindrical chamber 64 with an internal spiral baffle plate 66 extending from the ceiling to the floor of the chamber 64. As indicated more clearly by the arrows in FIG. 3, the mixture enters chamber 64 from duct 62 at an aperture 68 in the cylindrical wall of the chamber 64 and is immediately directed in a circumferential path along the inner surface of chamber 64 by the spiral baffle plate 66. The spiral channel formed by baffle plate 66 terminates in a large central chamber core 70 defined by the inner convolution of the baffle 66.

As particularly noted in FIG. 3, the convolutions of plate 66 are closely spaced along one chamber radial lying opposite the entrance 68. The convolutions are more widely spaced at the opposite radial. This spacing of the convolutions forms alternating venturi sections 72 and diffusing sections 74 in the spiral channel which will cause the mixture to be alternately accelerated and decelerated respectively as it passes to the central core 70. The droplets of liquid suspended in the gas will be influenced by gravity more significantly in the diffusing sections and consequently will tend to drop more rapidly in the diffusing sections to lower portions of chamber 64. The venturi sections 72 will tend to accelerate the gas and the droplets and consequently will generate greater centrifugal forces to impel the droplets against the walls of chamber 64 or the baffle plate 66. Again, gravity will tend to pull the centrifuged droplets adhering to the walls and plate to lower portions of the chamber 64. As a result, both the venturi sections 72 and the diffuser sections 74 supplement what would otherwise be a simple centrifugal separating process. Liquid which reaches the lower portion of chamber 64 will eventually pass through the spiral channel into the central core of the chamber 64.

The inner convolution of the baffle plate 66 terminates at a point in the convolution which forms a diffusing section in the spiral channel. The gas flowing in the spiral channel at this point will be decelerated in this diffusing section to join the relatively low velocity gas in the central core 70 with a minimum of turbulence. Minimizing this turbulence aids in the settling of the remaining liquid to the floor of chamber 64.

A centrally located scavenging drain 76 in the floor of chamber 64 empties into a duct 78 which leads to a liquid scavenging port 80 in wall 40. If the tank 10 is a demister tank operating with a rotary compressor, the scavening port 80 may be connected to the low pressure suction inlet of the compressor.

Since the liquid entrained in the mixture entering chamber 64 gravitates toward the floor of chamber 64, liquid-free gas will be found in the upper portion of the chamber core 70. Accordingly, the ceiling of chamber 64 includes a gas exit 82 which is connected by a discharge duct 84 to a discharge port 86 in wall 40.

The terminal end of discharge duct 84 includes a discharge nozzle 88 through which the liquid-free gas must pass in order to reach port 86. The discharge nozzle 88 has a venturi form in which the throat is specifically sized to provide choked flow at a desired minimum upstream pressure. For various reasons it may be preferred to maintain a pressure no less than a given value at some point upstream of nozzle 88, such as the oil reservoir which feeds oil to the rotary compressor that discharges the mixture into tank 10. The discharge nozzle 88 will maintain the desired pressure at choked flow regardless of the pressure at discharge port 86. The nozzle and its function are described in greater detail in U.S. Pat. No. 3,318,514 issued May 9, 1967, to R. O. Garbus.

It will be understood that various modifications can be made to the disclosed structure without departing from the spirit and scope of the invention. For example, it is not essential to the separating function that all components be mounted on plate 40. Such construction, however, permits the discharging connections and the access plate 46 to be located at one side of the tank which may be conveniently exposed externally for accessibility. While the venturi sections 72 and diffuser sections 74 defined by the spiral baffle 66 are located along diametrically opposite radials, it is feasible that more than one venturi and diffuser section can be formed between consecutive convolutions by specially forming the spiral baffle plate 66. In such case, the locations of the venturi and diffuser sections will not be along diametrically opposite radials. While the discharge nozzle 88 is conveniently located in the discharge duct 84, the nozzle itself is not essential to the separating process and consequently may be deleted without destroying the utility of my multistage separator.

What is claimed is:

1. An improved centrifugal separator for gases having suspended liquid particles entrained therein comprising:

a closed chamber, said chamber being defined by a generally cylindrical side wall and a pair of parallel oppositely disposed planar end walls, the axis of said cylindrical chamber being arranged substantially vertically;

means including a port in the upper of said end walls for discharging gas from said chamber;

means including a port in the lower of said end walls for discharging from said chamber liquid separated from a liquid-gas mixture delivered to said chamber, said gas and liquid discharge ports being in substantially aligned relationship;

a spiral baffle disposed in said chamber between said end walls, said baffle being connected at a first end to said side wall and having a plurality of convolutions which define alternate venturi and diffusing sections for alternately accelerating and decelerating a liquid-gas mixture, said baffle venturi sections are aligned with contiguous convolutions closely spaced at one radial of the cylindrical chambers, the inner convolution of said baffle defining an open core which communicates with said discharge ports; and means including a supply port in said side wall adjacent the point of attachment of said baffle first end for supplying a liquid-gas mixture to said chamber, said supply port being intermediate the ends of said chamber.

* * * * *